(12) United States Patent
Studer

(10) Patent No.: US 8,925,709 B2
(45) Date of Patent: Jan. 6, 2015

(54) PRODUCT HANDLING SYSTEM AND CARRIER DEVICE

(71) Applicant: CSB-Automation AG, Kestenholz (CH)

(72) Inventor: Max Studer, Kestenholz (CH)

(73) Assignee: CSB International AG, Kestenholz (CH)

( * ) Notice: Subject to any disclaimer, the term of this patent is extended or adjusted under 35 U.S.C. 154(b) by 0 days.

(21) Appl. No.: 14/020,591

(22) Filed: Sep. 6, 2013

(65) Prior Publication Data

US 2014/0061001 A1 Mar. 6, 2014

(30) Foreign Application Priority Data

Sep. 6, 2012 (EP) ..................................... 12183304

(51) Int. Cl.
 *B65G 47/26* (2006.01)
 *B65G 65/00* (2006.01)
 *B65G 1/02* (2006.01)

(52) U.S. Cl.
 CPC ................ *B65G 1/023* (2013.01); *B65G 65/00* (2013.01)
 USPC ..................... 198/435; 198/347.1; 198/349.1; 414/277

(58) Field of Classification Search
 CPC .... B65G 1/023; B65G 1/0435; B65G 1/0457; B65G 2203/0216; B65G 1/16; B65G 65/00; B65G 35/08; B65G 47/52; B65G 47/60
 USPC ................ 198/435, 347.1, 347.2, 354, 349.1, 198/349.5; 414/267, 268, 269, 277, 278
 See application file for complete search history.

(56) References Cited

U.S. PATENT DOCUMENTS

| 1,454,575 | A | * | 5/1923 | Boyd .............................. 404/108 |
| 1,550,248 | A | * | 8/1925 | Gehnrich ....................... 198/681 |
| 2,479,680 | A | * | 8/1949 | Hamilton, Jr. ................. 198/687 |
| 2,718,972 | A | | 9/1955 | Temple |
| 4,229,137 | A | * | 10/1980 | Molins .......................... 414/806 |
| 4,240,353 | A | | 12/1980 | Barth |
| 4,941,578 | A | * | 7/1990 | Devening ...................... 211/186 |
| 5,348,436 | A | * | 9/1994 | Hogenkamp et al. ..... 414/331.01 |
| 5,547,329 | A | | 8/1996 | Hirai et al. |
| 2005/0149226 | A1 | | 7/2005 | Stevens |
| 2005/0279613 | A1 | | 12/2005 | Ufland et al. |
| 2010/0108464 | A1 | * | 5/2010 | Davi et al. ................... 198/347.1 |
| 2011/0139579 | A1 | * | 6/2011 | Philipp ....................... 198/347.1 |

FOREIGN PATENT DOCUMENTS

| DE | 202010017361 | 1/2012 |
| FR | 2146463 | 3/1973 |
| FR | 2562523 | 10/1985 |
| WO | WO03/011484 | 2/2003 |
| WO | WO 2010/085141 | 7/2010 |

* cited by examiner

*Primary Examiner* — James R Bidwell
(74) *Attorney, Agent, or Firm* — Quarles & Brady LLP

(57) ABSTRACT

A carrier device and product handling system are described, in which product items are stored or transported through a product processing environment including such stages as portioning, packaging and labeling. The carrier device is designed such that product items can be loaded and unloaded automatically on trays. Traceability is provided by means of a machine-readable tag storing information relating to the contents of the carrier device's array of compartments. Examples of loading and unloading mechanisms are also described. The invention has particular application to the processing of meat products or other perishable goods.

15 Claims, 12 Drawing Sheets

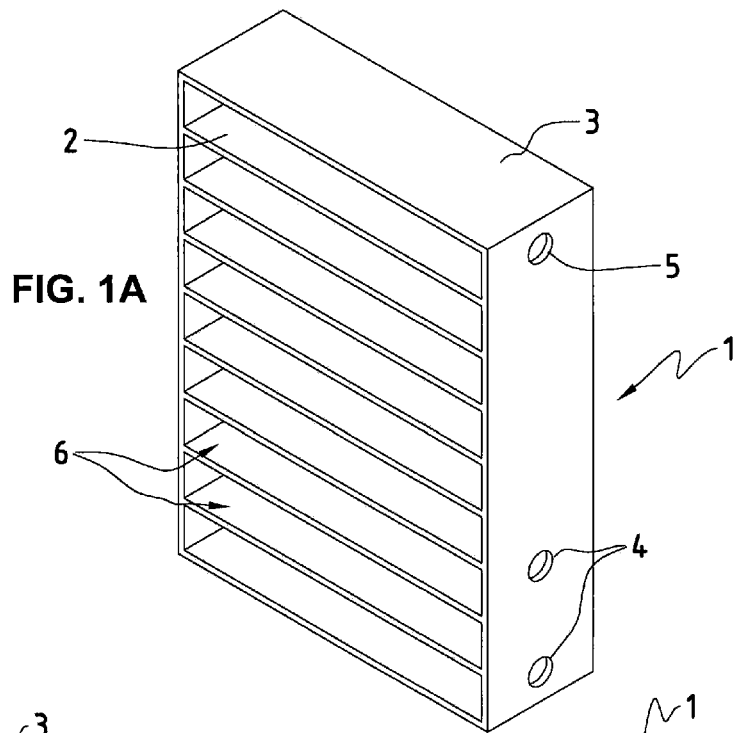
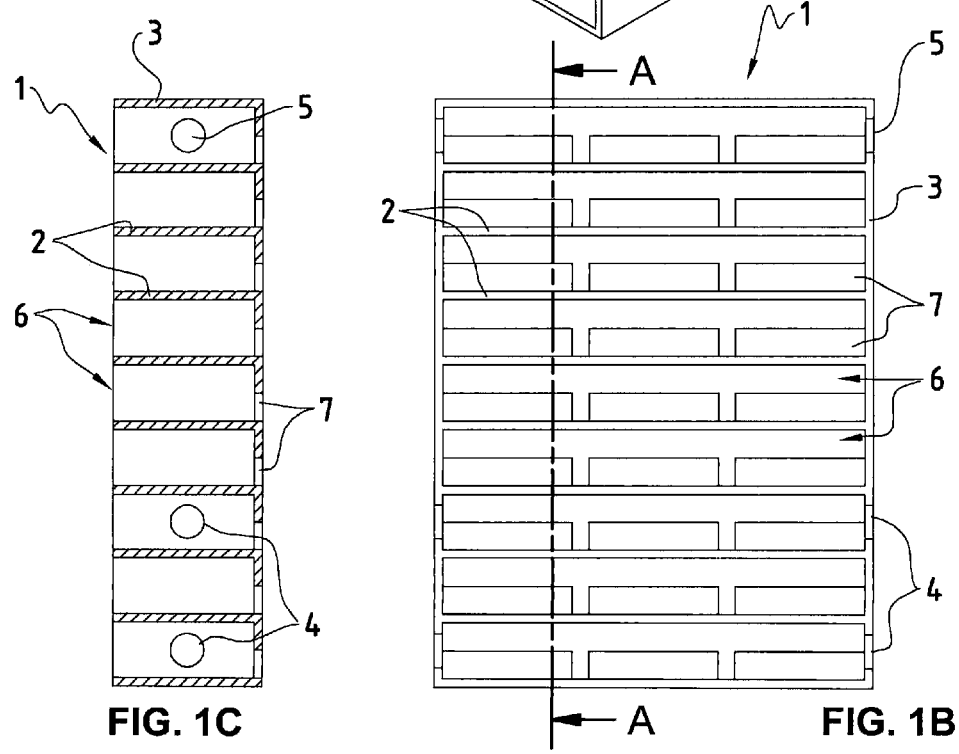
FIG. 1A
FIG. 1C  FIG. 1B

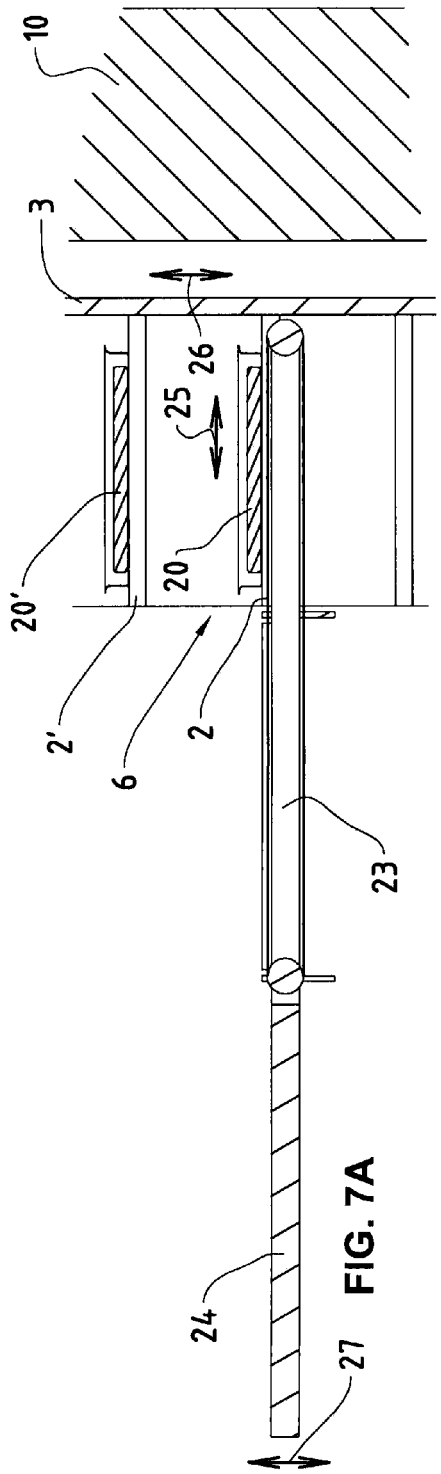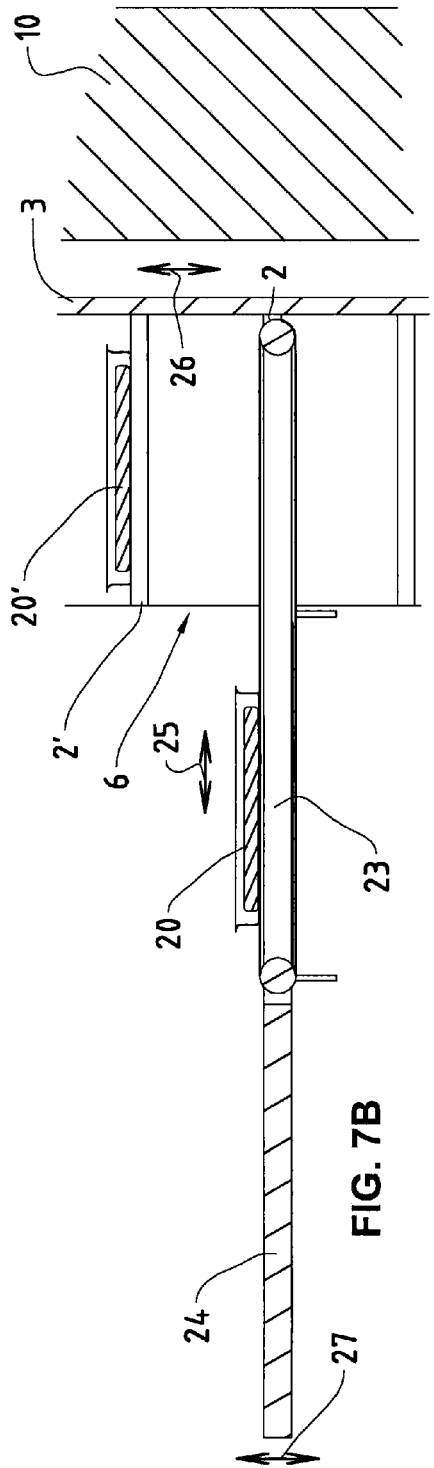

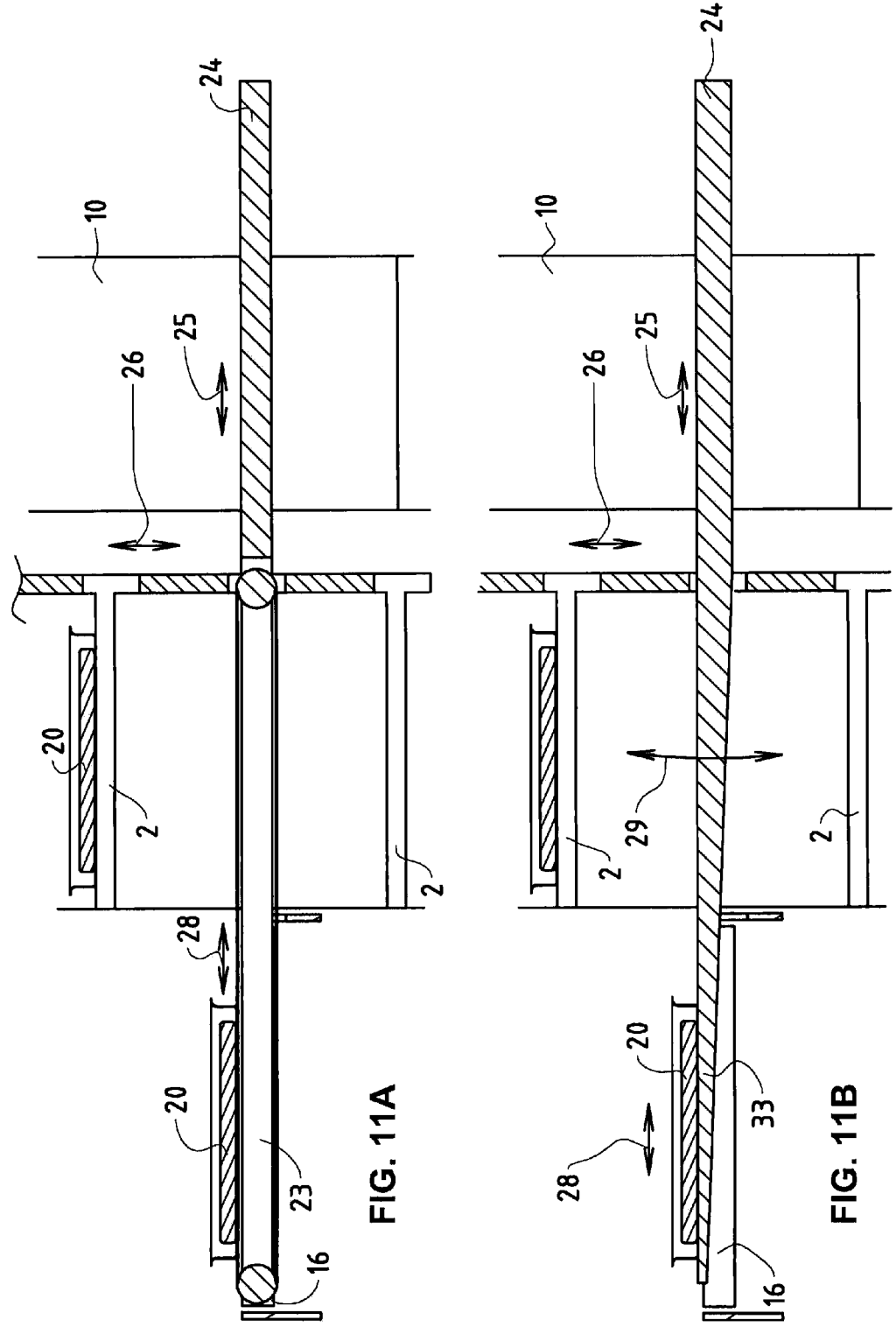

FIG. 12A
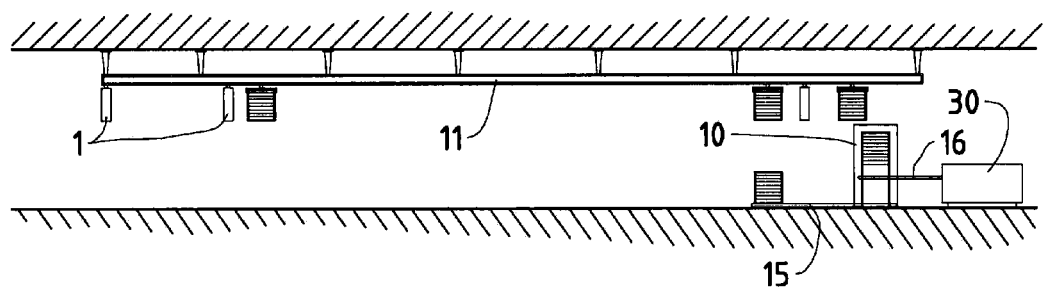
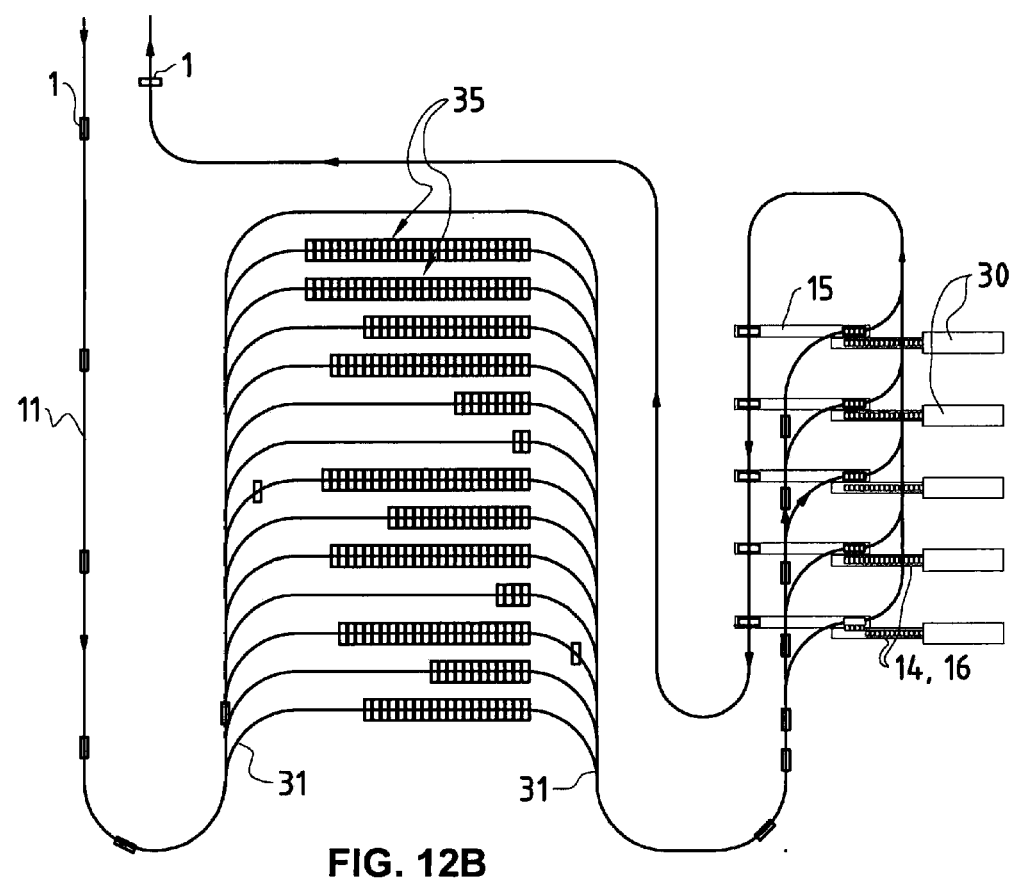
FIG. 12B

PRODUCT HANDLING SYSTEM AND CARRIER DEVICE

RELATED APPLICATIONS

This application claims priority under 35 U.S.C. § 119 to European Application No. EP 12183304.0 filed on Sep. 6, 2012, the entire contents of which are incorporated herein by reference.

The present invention relates to the field of automated product handling systems, for example in product processing plants, where many similar items are transported between different processing stations for performing operations such as sorting, quality inspection, packaging and the like.

In particular, but not exclusively, the invention relates to a carrier device for the automated transport and/or temporary storage of batches of products between such processing operations.

BACKGROUND OF THE INVENTION

Automated manufacturing and processing plants frequently require an efficient, optimized movement of components, products or other items through the plant as they travel between processing stations. In this application, a meat packaging plant is taken as an example; however it should be understood that the principles and ideas described here can be employed with a wide variety of other types of products and processes.

Where large numbers of items (eg meat products) need to be moved around a processing plant, this is typically achieved using conveyor belts (for continuous transport) or containers or pallets (for batch transport). In a meat packaging plant, for example, meat portions may arrive on a conveyor belt from the butchery, with each portion in an individual plastic tray. Such trays may be re-usable transport carriers, used for reasons of hygiene, or, more usually, the trays are so-called primary packaging trays, and will remain with the meat portion until it reaches the end consumer. The incoming trays are usually lifted off the conveyor belt by an operator and stacked manually in stackable crates or on pallets. Some products, such as plastic or metal components, may be suitable for lifting off the belt and into the crates in an automated process, for example by means of a jointed robotic grab or arm, but such mechanisms are costly and require frequent maintenance.

Handling of the charged crates or pallets can then be performed automatically, and each crate/pallet can be stored until required and then delivered to its intended destination (for example a shrink-wrapping station) by transport robotics and/or on conveyor belts. Robotic lifting and moving systems may be used for stacking and unstacking crates as required, under the control of the process management software of the whole system.

In the example case of meat processing (as well as in other applications), product traceability is very important. Each individual product item must be reliably traceable and identifiable throughout the processing and handling. Existing traceability systems rely on attaching identifying markers to the meat product itself, or to the carrier on which the product is being conveyed.

PRIOR ART

German utility model DE202010017361U1 (Tönnies Holding GmbH) describes a meat processing arrangement with a traceability system. Meat portions are placed in transport containers and packed on to pallets for storage during the maturing phase. The pallet is labeled with a ticket bearing a unique identification code and details of the current meat processing rate and the pallet loading time. Pallets have the disadvantage of taking up floor space, and being difficult to stack. Furthermore, such a labeling scheme, while simpler than labeling each individual transport container on the pallet, cannot provide a completely accurate traceability of each meat portion on the pallet.

The advantages of an overhead conveyor system are known from WO2010/085141 (Marel Stork Poultry Processing BV), which discloses a system of tray carriers for transporting meat products from an import station to an export station. Meat is already placed in packaging trays, and the import station is provided with means for selectively directing the trays off a conveyor and on to the passing tray carriers. The carriers are provided with integral means for ejecting the trays when they reach the export station. An RFID tag is incorporated, as an insert, in each packaging tray for identifying the meat portion contained in the tray. The continuous conveyor-belt transport system is inflexible (ie complicated to reconfigure), and the RFID tag per portion is costly. Conveying the portions one at a time is also slow, and does not easily lend itself to efficient queueing of successive processes, or to temporary storage of the product items (meat portions). The system only works efficiently when all the consecutive processes operate in synchronization, at the same rate.

Another overhead-conveyor system is known from US4,240,353 (Barth). In this system, a vertical rack is used for conveying multiple carriers, each bearing meat products. The carriers are loaded into and unloaded from the rack by hand. The racks can be used for storage as well as for transport. However, this is a relatively crude system, designed for ease of manual loading and unloading, and it is not suitable for use in an automated product processing environment.

A system similar to a paternoster is known from US20050279613 (Ufland et al). This system comprises a number of moving racks which are designed to allow diners to load their cafeteria trays on to the racks by hand as the racks pass by. The laden racks then travel, on an endless overhead conveyor, to a destination point, where the trays are removed from the racks, again by hand. Such a transport system is suitable for collecting and transporting manually loaded and unloaded trays, but would not be suitable for use in an automated product processing environment.

BRIEF DESCRIPTION OF THE INVENTION

The invention described in this application seeks to overcome the above and other difficulties inherent in the prior art. In particular, the invention aims to provide a carrier device, otherwise referred to as a transport magazine, for conveying a batch of product items between two or more processing stations in a product processing system, wherein the carrier device comprises a substantially rigid frame comprising a substantially planar array of product accommodating regions, each of the product accommodating regions comprising a support surface for bearing at least one of the product items during the conveying, wherein the array comprises a plurality of rows and a plurality of columns of product accommodating regions, each of the product accommodating regions is provided with a first access opening in a front face of the array, through which access opening a product item can be introduced into or removed from the product accommodating region, and the substantially rigid frame comprises one or more transport attachment points for engaging with a carrier conveyor means. The substantially rigid frame is provided with, in addition to the first access openings in the front face, a plurality of pusher openings in a rear face of the array, through which a pusher bar can be inserted so as to expel a product item from the product accommodating region by sliding the said product towards the front face and out of the product accommodating region, and/or the product support surface of each product accommodating region comprises one or more slits, each of the slits extending along an axis substantially orthogonal to the plane of the array and extending over at least half of the distance between the front face and the rear face, wherein each of the slits is open towards the front and/or rear face of the array, and arranged to allow a narrow, elongated conveyor belt or bar to pass through the slit in the product support surface so as to lift a product item resting on the product support surface clear of the product support surface. Such a carrier device combines the advantages of bulk handling of product items with easy, automated loading of the device/magazine, thereby avoiding the need for manual intervention.

The invention also envisages a product batch handling system, comprising:

a plurality of processing stations for performing one or more processing operations on a plurality of similar product items, a plurality of batch product carriers, each of the batch product carriers being for accommodating a plurality of the product items during transport or storage of the product items between the processing stations, batch product carrier conveying means for transporting the batch product carriers between the processing stations, the product batch handling system being characterized in that:

each of the plurality of batch product carriers is a carrier device as described above;

the product batch handling system further comprises loading means for introducing product items into the product accommodating regions of the carrier devices from a first product conveyor, and/or unloading means for displacing product items out of the product accommodating regions of the carrier devices on to a second product conveyor.

According to a variant of the system of the invention, the loading means and/or unloading means comprise vertical displacement means for moving each carrier device up and/or down such that the access openings of successive vertical rows of product accommodating regions of the array travel vertically past a loading and/or unloading mechanism, and wherein the loading and/or unloading mechanism comprises one or more displacement devices for introducing product items into and/or removing product items from the row of product accommodating regions. The product items or trays can thus be loaded into or unloaded from the carrier device/magazine as it proceeds along its path through a processing environment.

According to another variant of the system of the invention, the vertical displacement means is arranged to move the carrier devices substantially continuously past the loading and/or unloading mechanism, and wherein the loading and/or unloading mechanism is adapted to introduce product items into and/or remove product items from each carrier device as it travels past. In this variant, the loading and unloading can be performed without stopping the carrier device/magazine in its path, thereby further reducing the time needed for the overall processing.

According to another variant of the system of the invention, the vertical displacement means is arranged to index the carrier devices vertically past the loading and/or unloading mechanism in a series of steps corresponding to the rows of the array, and wherein the loading and/or unloading mechanism is adapted to introduce product items into and/or remove product items from each carrier device while the vertical movement of the carrier device is paused. This variant enables the use of simpler, more mechanically robust loading and unloading mechanisms.

According to a further variant of the system of the invention, the product support surface of each product accommodating region comprises one or more slits, and wherein the loading and/or unloading mechanism comprises a plurality of narrow, elongated conveyor belts or bars arranged such that, when each row of product accommodating regions passes vertically past the loading and/or unloading mechanism, the conveyor belts or bars pass through the slits so as to lift product items off the product support surfaces. In this way, conveyors belts or bars can be used which can remain in position while the carrier device/magazine passes around them.

According to a further variant of the system of the invention, the unloading mechanism comprises one or more first pusher bars for, for each row of product accommodating regions passing vertically past the unloading mechanism, being displaced through the one or more pusher openings so as to displace product items out through the access openings and on to the second product conveyor. The use of pusher bars enables fast, simple and accurate ejection of the trays from within the carrier device/magazine.

According to another variant of the system of the invention, the loading mechanism comprises one or more second pusher bars for, for each row of product accommodating regions passing vertically past the loading mechanism, pushing product items off the first product conveyor through the access openings and into the product accommodating regions. The use of pusher bars enables fast, simple and accurate loading of the trays into the carrier device or magazine.

According to another variant of the system of the invention, the carrier device conveying means comprises at least one overhead conveyor track, and wherein the carrier devices are suspended from the overhead conveyor track during the transport of the carrier devices between the processing stations.

According to another variant of the system of the invention, the overhead conveyor track comprises junctions and/or bifurcations, and wherein the route taken by each carrier device along the overhead conveyor track is determined by the state of one or more switching points under control of a system control means.

According to another variant of the system of the invention, the overhead conveyor track comprises buffer regions for temporarily accumulating carrier devices upstream of one or more processing stations so as to buffer the flow of carrier devices to the one or more processing stations.

According to another variant of the system of the invention, the system comprising one or more storage regions, wherein the carrier devices are arranged for storage of the product items in the storage regions.

According to another variant of the system of the invention, the carrier devices are shaped such that they are stackable one upon another.

According to another variant of the carrier device or system of the invention, the or each carrier device comprises a machine-readable data tag containing identification or origin information of the product items being carried by the carrier device.

According to another variant of the carrier device or system of the invention, the or each carrier device comprises a machine-readable data tag containing identification information relating to the contents of the carrier device, and wherein the identification information is referenced to the row-column positions of the product items in the array.

According to another variant of the system of the invention, the product items are perishable comestibles, and wherein the plurality of processing stations comprises one or more packaging machines.

According to another variant of the system of the invention, the product items are meat products.

DETAILED DESCRIPTION OF THE INVENTION

The invention and its advantages will further be explained in the following detailed description, together with illustrations of example embodiments and implementations given in the accompanying drawings, in which:

FIGS. 1A to 1C show perspective, front and cross-sectional views respectively of a carrier device according to a first embodiment of the invention. FIG. 1C shows a cross-section taken through the line A-A indicated in FIG. 1B.

FIGS. 7A and 7B show sectional views of the loading/unloading station of FIG. 6.

FIGS. 11A and 11B show sectional views of the loading/unloading station of FIGS. 9 and 10.

FIGS. 12A and 12B show side and plan views of an example application of a system according to the invention.

Figure 2:
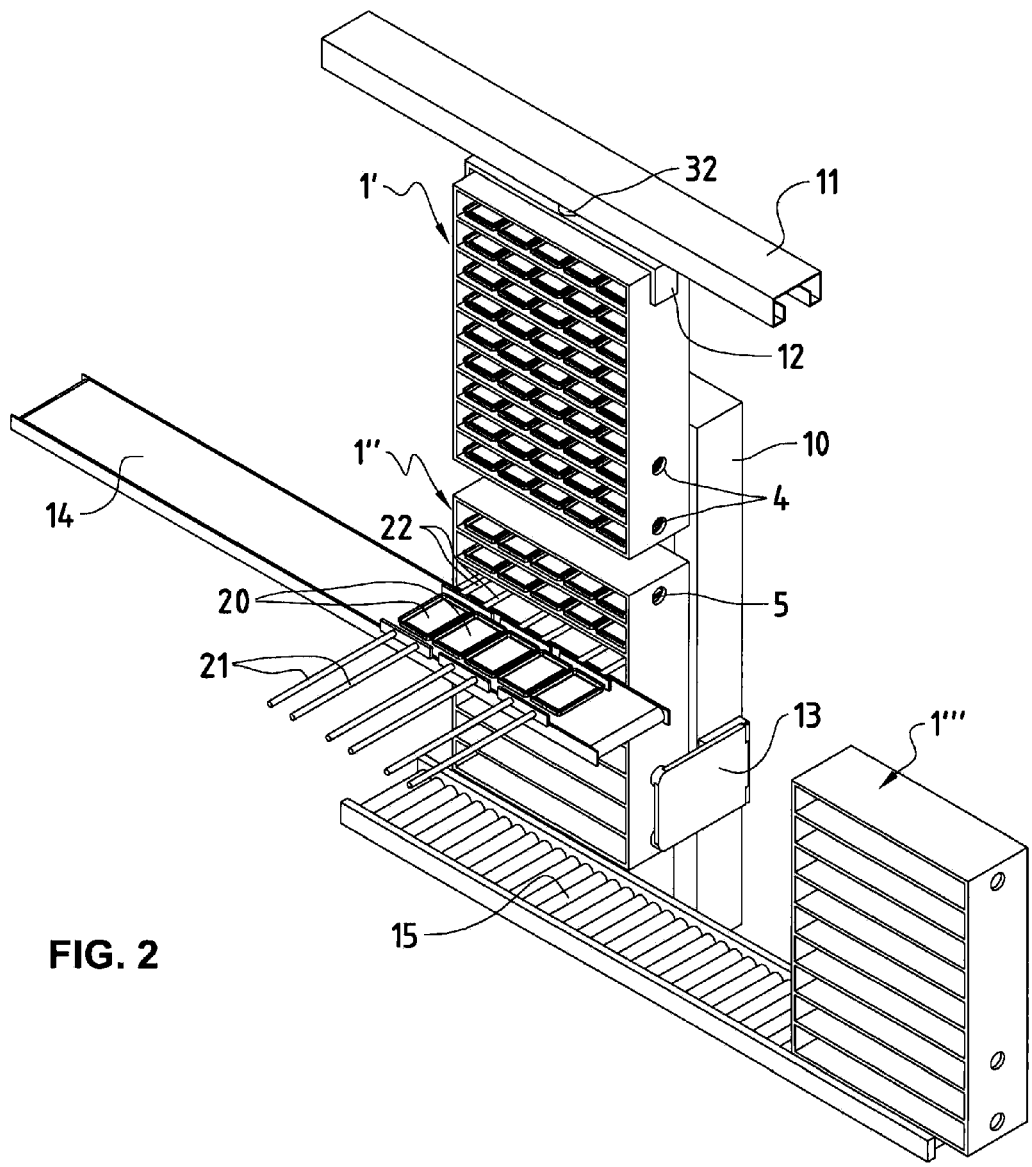
FIGS. 2 and 3 illustrate front and rear perspective views of an example loading/unloading station forming part of a system according to the first embodiment of the invention.

Note that the drawings are intended merely as illustrations of embodiments of the invention, and are not to be construed as limiting the scope of the invention. Where the same reference numerals are used in different drawings, these reference numerals are intended to refer to the same or corresponding features. However, the use of different reference numerals should not necessarily be taken as an indication that the referenced features are dissimilar.

The first embodiment of the invention will be described with reference to FIGS. 1 to 4. FIG. 1A to 1C show a carrier device, 1, comprising a substantially rigid frame, 2, containing multiple shelf-like or rack-like surfaces, 2, each of which is designed to accommodate product items, or trays bearing the product items to be transported. As will be seen, the use of trays significantly improves the handling of irregularly-shaped or soft items such as meat products, for example. Trays are better suited to automated handling, since they are uniformly-shaped and uniformly-sized. The example carrier device, 1, is shown with attachment points 5 and 4, for attaching to lifting or suspending devices. In the example shown, these attachment points are illustrated as holes in the frame of the carrier device, but the attachment points could be implemented in many possible ways. Once the product-supporting surfaces 2 of carrier device 1 are loaded with product items, or trays of product items, the carrier device 1 may be handled as a single unit. Each product-supporting surface 2 is arranged to accommodate two or more trays, side by side. Between the product-supporting surfaces are the compartments which are referred to in this description as product accommodating regions, where the trays will be stored during transport. Thus, when the frame is loaded, the frame contains an array of multiple rows and multiple columns of similar trays.

The reference numeral 6 indicates the access openings through which the trays are introduced and/or removed from the product accommodating regions.

As can be seen in FIG. 1B, the carrier device of this embodiment comprises pusher openings 7 in the rear face of the array of product accommodating regions in the frame 3. As will be seen, these openings are designed to allow pusher elements (such as bars, rods or the like) to enter the product accommodating regions through the rear surface of the array, and thereby push the trays out through the access opening 6.

Note that the terms "carrier device" and "magazine" are used in this application to refer to a device or apparatus for accommodating, storing or containing a batch of similar items in a regular pattern or arrangement. The items may be objects which can be handled in their own right, or they may be single of multiple objects arranged in or on a tray. The term "tray" is used to refer to a standardized carrier for product items. A tray in this sense may be flat, or have raised sides. It may be closed, by means of a lid, for example, or it may be open. The particular shape and size of the tray will depend on the shape and size of the product items to be transported, and on how many of them are to be accommodated by each tray. In the case of more regular product items which can themselves be handled in an automated fashion (for example, items which are uniform in shape and size, and made of a suitably hard or resilient material), separate trays are not needed. Such regular, handleable product items can therefore be regarded as comprising integral "trays" for the purposes of this definition of the term. The tray may form part of the packaging (so-called primary packaging) of each product item.

Figure 3:
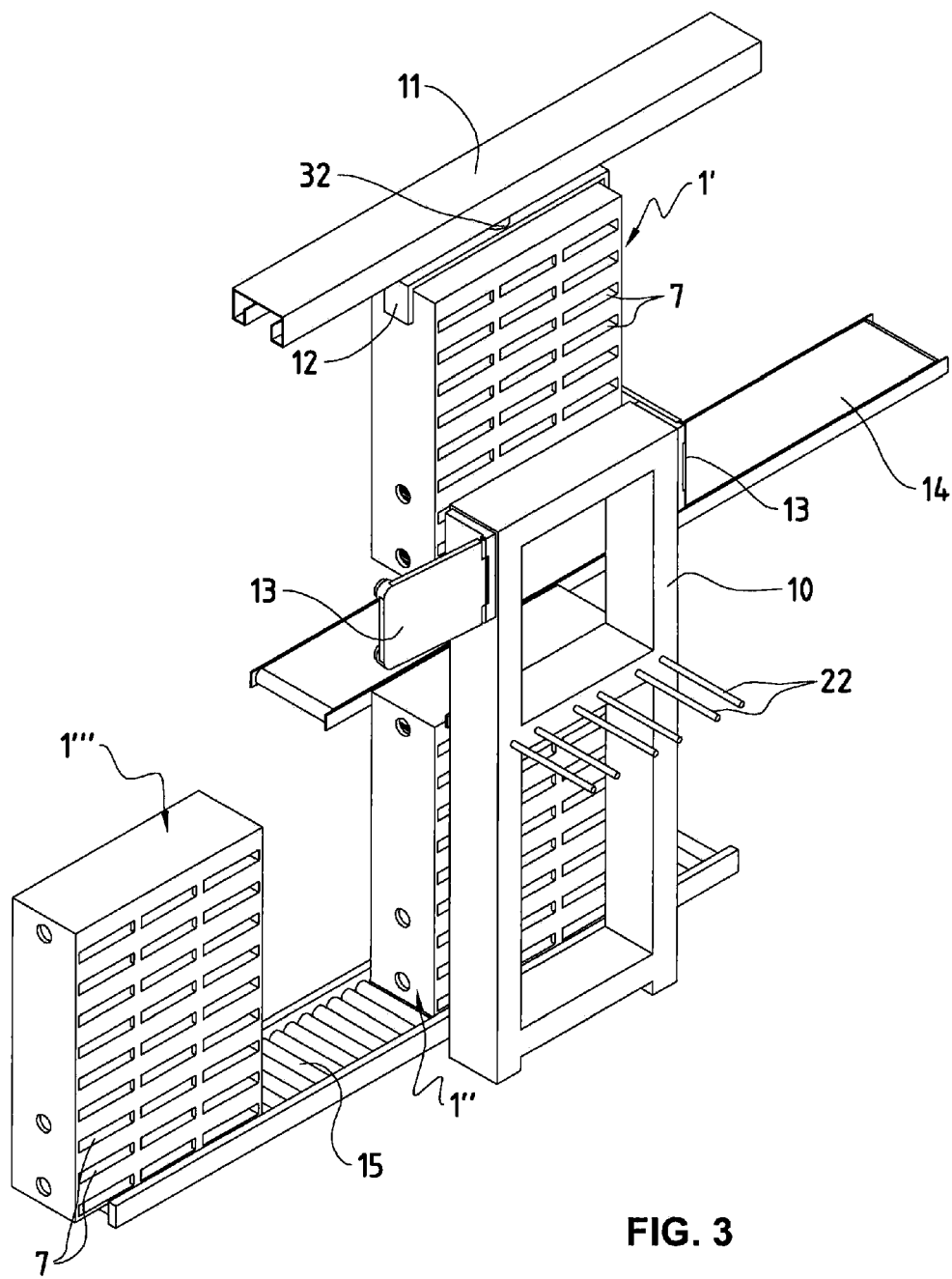

FIGS. 2 and 3 show a loading/unloading station which may be used in a system according to the first embodiment of the invention. Three carrier devices 1', 1" and 1''', which are as described with reference to FIGS. 1A to 1C, are depicted in three successive stages in an unloading sequence. Magazine 1" is shown in the course of being unloaded, while carrier device 1' is waiting to be unloaded, and carrier device 1''' has been unloaded, and has been moved away, ready to be collected and returned for reloading, or to be reloaded with the product items or trays 20 once they have been processed by processing.

Carrier device 1' is shown suspended from overhead conveyor 11 by means of attachment bracket 12, which engages with attachment points 5 of the carrier device (attachment points 5 are represented as holes in the side walls of the carrier device frame, by way of example). A swivel joint or bearing is shown, which enables the carrier device to be rotated while suspended from the overhead conveyor 11. The carrier device 1' also has attachment points for engaging with the vertical displacement mechanism 10, 13, which holds each carrier device and lowers it (in the case of unloading) past the conveyor 14 as the product items or trays 20 are discharged on to the conveyor 14 row by row. Conveyor belt 14 may carry the trays to a packaging station (not shown), for example. Vertical displacement means 10, 13 is illustrated in schematic form with carrier-device-holding arms 13 travelling up and down a frame 10. The carrier-device-holding arms 13 are adapted to engage with corresponding attachment points 4 on the carrier devices so as to hold the carrier devices firmly and move them up or down as required.

Note that this embodiment and the second embodiment are illustrated with an overhead conveyor for transporting the carrier devices 1. However, other methods and means of transporting the carrier devices could be used instead, or in combination, such as an arrangement of conveyor belts arranged so that the carrier devices stand on the conveyor belts, or a robotic carrier system for manipulating, moving, turning, stacking or lifting the carrier devices one by one or in multiples.

In this embodiment, successive rows of each carrier device 1 are brought level with the conveyor 14 by vertical displacement means 10, 13. The vertical displacement then pauses for a period which is at least long enough for trays 20 to be loaded into and unloaded from the product accommodating regions of the particular row by means of pushers 21, 22. A first set of pushers 21 is arranged to push the product items or trays 20 off the conveyor 14 and into the carrier device 1, while a second set of pushers 22 is arranged to be inserted through openings in the rear of the carrier device 1 and thereby push the product items or trays 20 of a particular row off the product-supporting surface(s) 2 of the row and on to the conveyor 14. The pushers can be any means of applying a lateral force to the trays; they may be simple elements such as rods or bars, for example, which can be mechanically, electrically, hydraulically or pneumatically driven to push one or more trays. As an alternative, the unloading may be performed by puller devices acting from the front side of the carrier device, for example, to slide or lift the product items or trays out by pulling.

Figure 4:
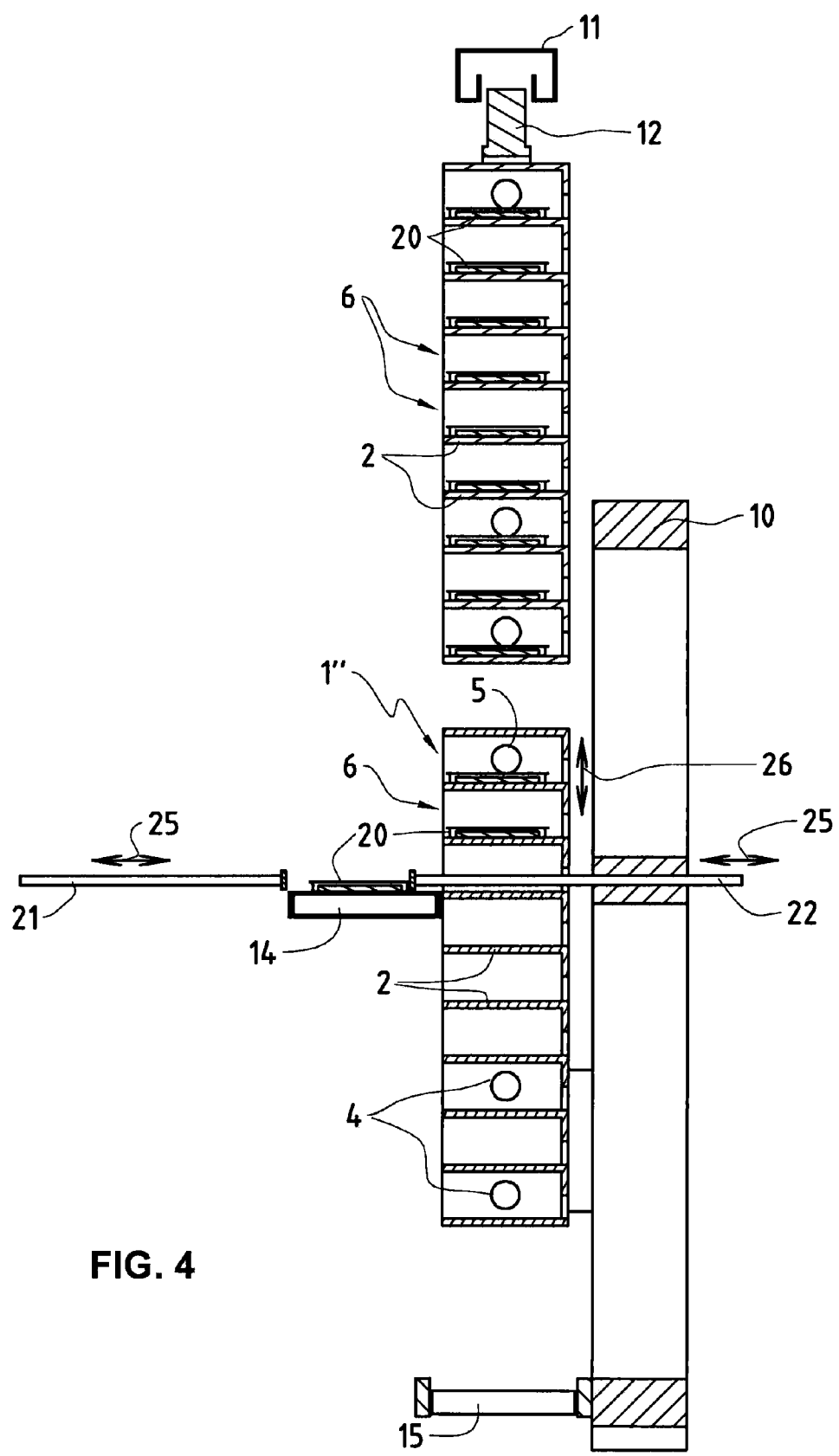
FIG. 4 shows a sectional view of the loading/unloading station of FIGS. 2 and 3.

FIG. 4 shows a sectional view of the loading/unloading arrangement of FIGS. 2 and 3. Arrow 25 indicates the direction of travel of the pusher elements 21 and 22, while arrow 26 indicates the direction of relative motion between the carrier devices 1 and the conveyor 14 during the loading or unloading.

Note that an unloading sequence has been described above; however the same sequence can be reversed to perform a loading of the product items or trays 20 into carrier devices 1.

The carrier device 1 may be provided with a machine-readable tag (such as an RFID tag) containing identification information of the contents of the carrier device. The information can be written to the tag before the carrier device leaves a loading station, and then read out again from the tag when the carrier device reaches its destination (unloading) station. Advantageously, each data record relating to a particular tray 20 can be written to the tag as the particular tray is being loaded. In this way, the information in the tag is kept synchronised with the corresponding trays 20. The data travels with the product items, so that the probability of identification data errors is reduced. The tag can be provided with data regions which correspond to the product accommodating regions of the carrier device. Thus, if the carrier device comprises a first number of rows and a second number of columns of product accommodating regions, then the data tag can be provided with a corresponding array of data records for containing identification and other data relating to the contents of the corresponding product accommodating region. Traceability of product items can thus be ensured without the need to attach identifiers to each product item or each tray 20. This is particularly important for meat-product processing, where the traceability must be assured at all times.

By using a tag for the carrier device, rather than for each of the product items or trays 20, it is also possible to reduce data processing time and complexity. For example, it is possible to perform a stock-take by reading the contents of one tag per carrier device, instead of reading tags on each tray. Similarly, as will be seen in conjunction with FIG. 12, the control of the routing of product items through the processing system can be significantly enhanced; a single reading of a single tag, for example, can determine which branch of a bifurcation should be followed by a carrier device.

Figure 5:
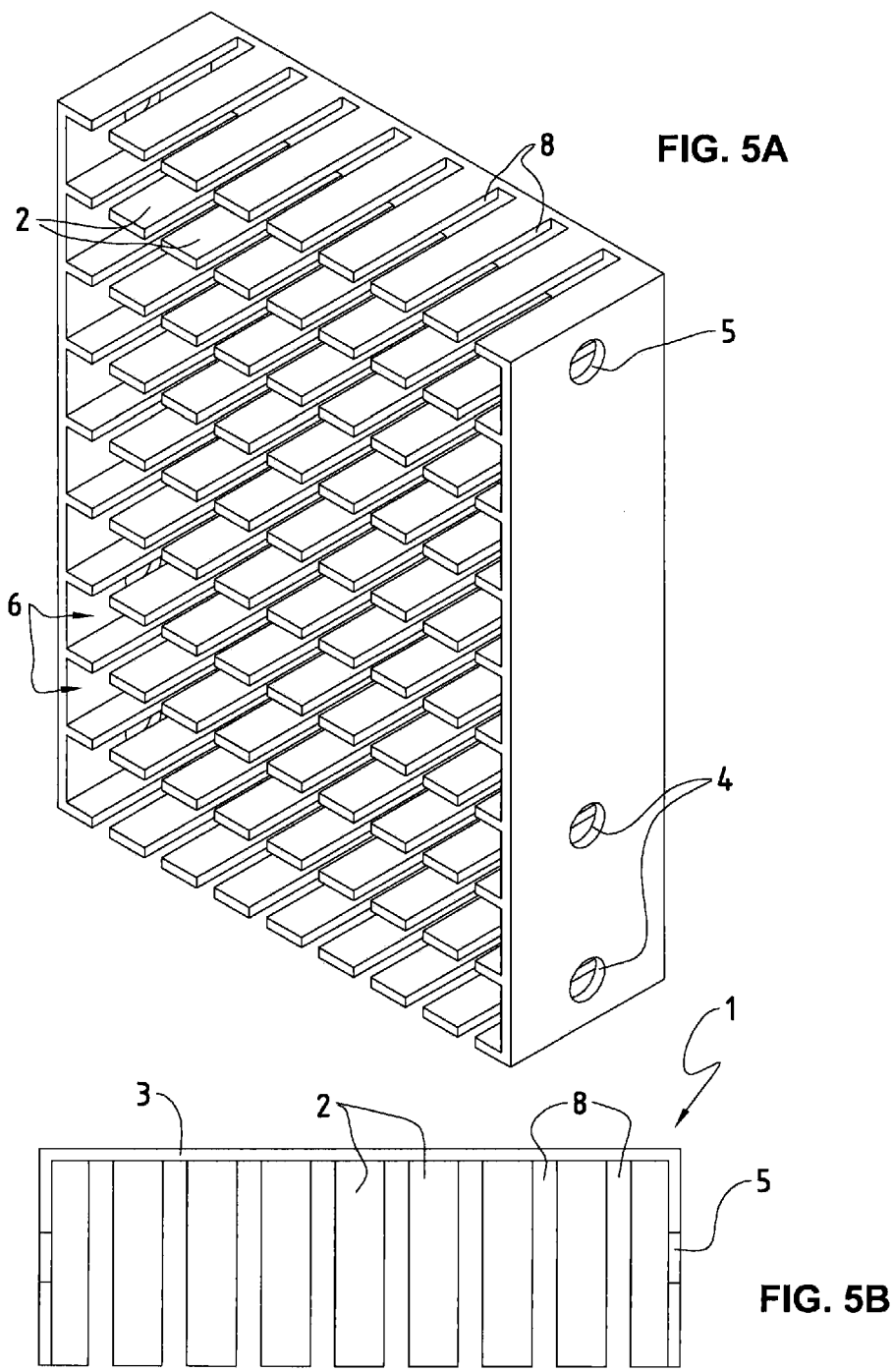
FIGS. 5A and 5B show perspective and plan views respectively of a carrier device according to a second embodiment of the invention.
Figure 6:
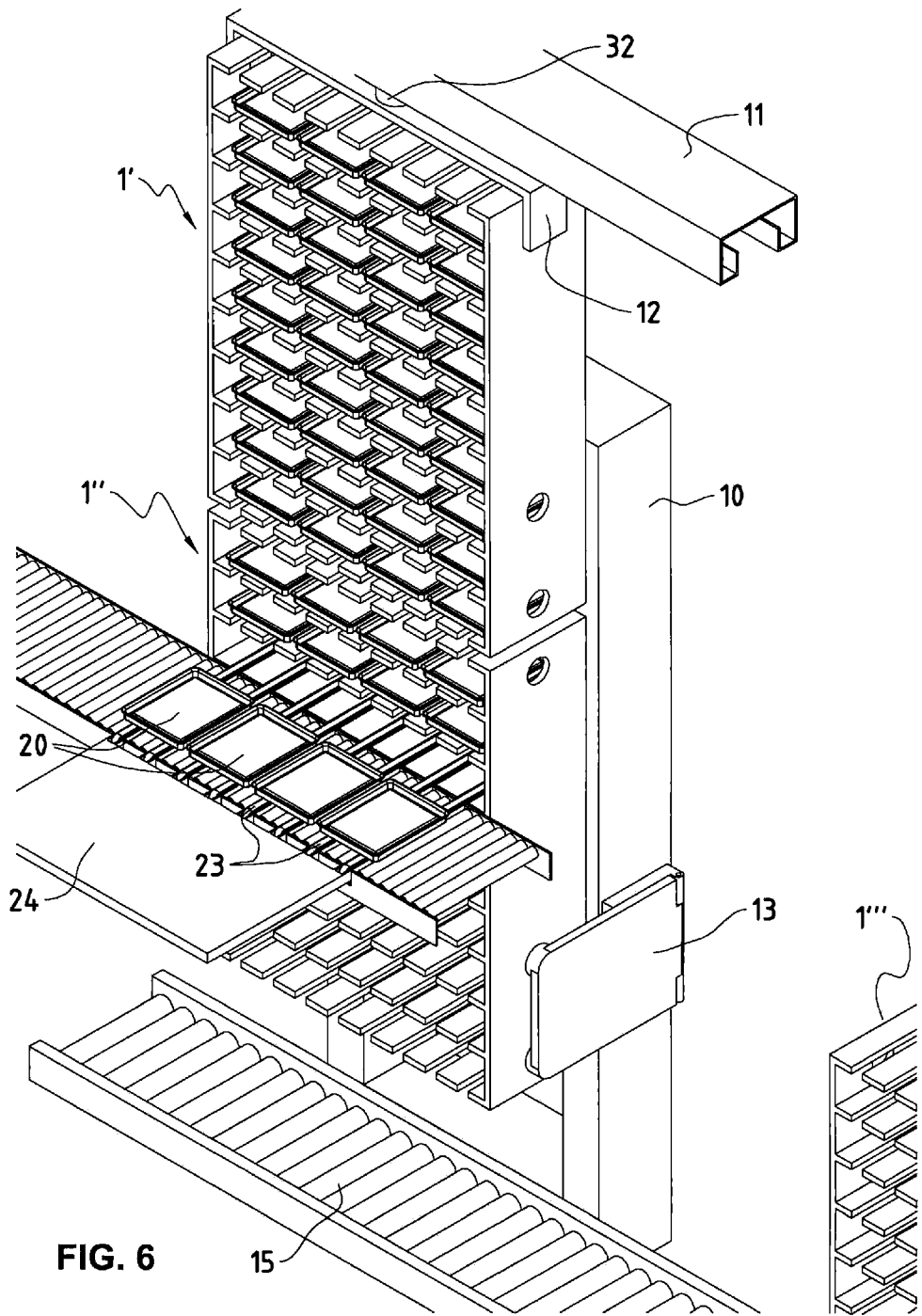
FIG. 6 illustrates a perspective view of an example loading/unloading station forming part of a system according to the second embodiment of the invention.
Figures 8A, 8B, 8C:
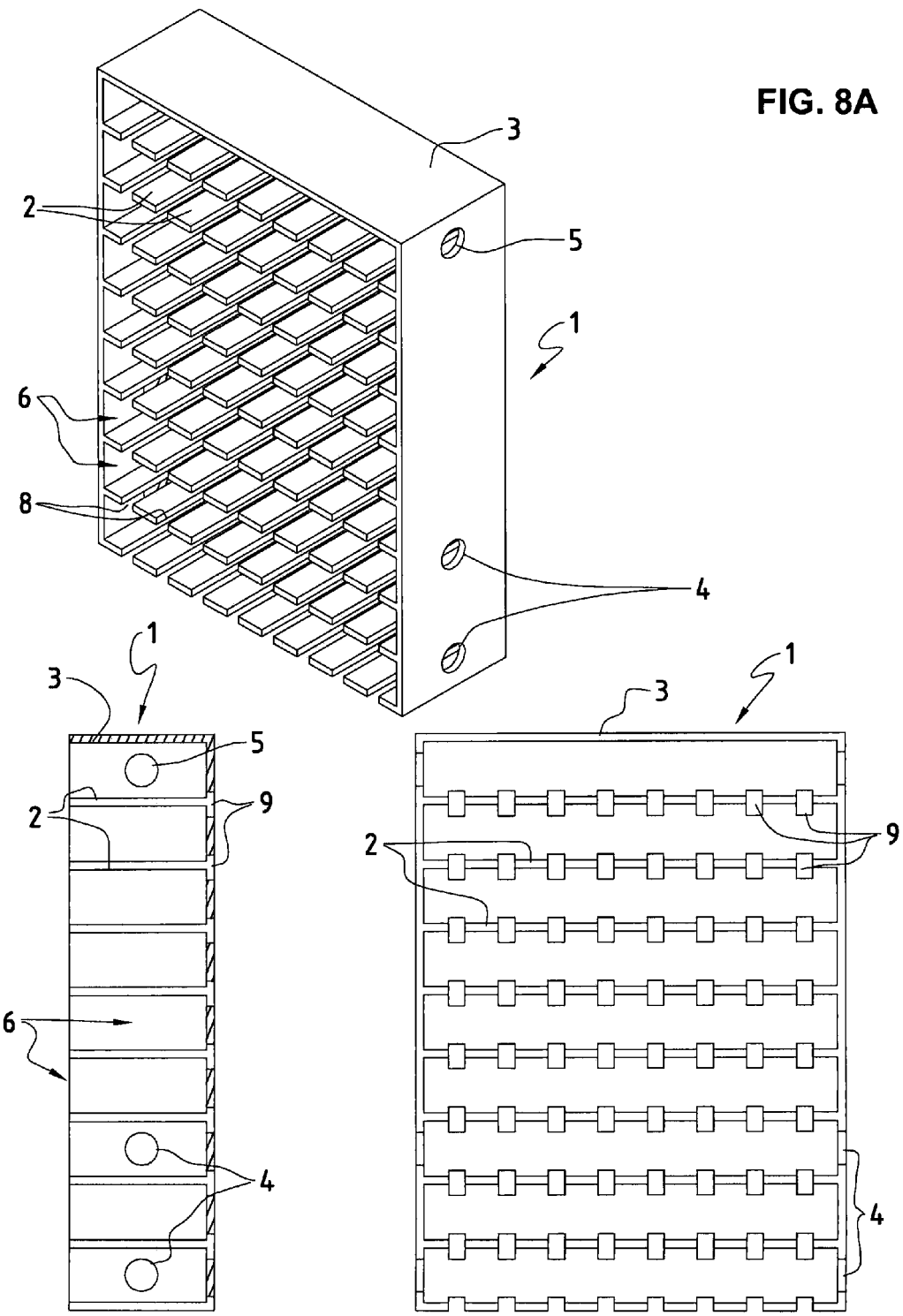
FIGS. 8A to 8C show perspective, front and cross-sectional views respectively of a carrier device according to a third embodiment of the invention.
Figure 9:
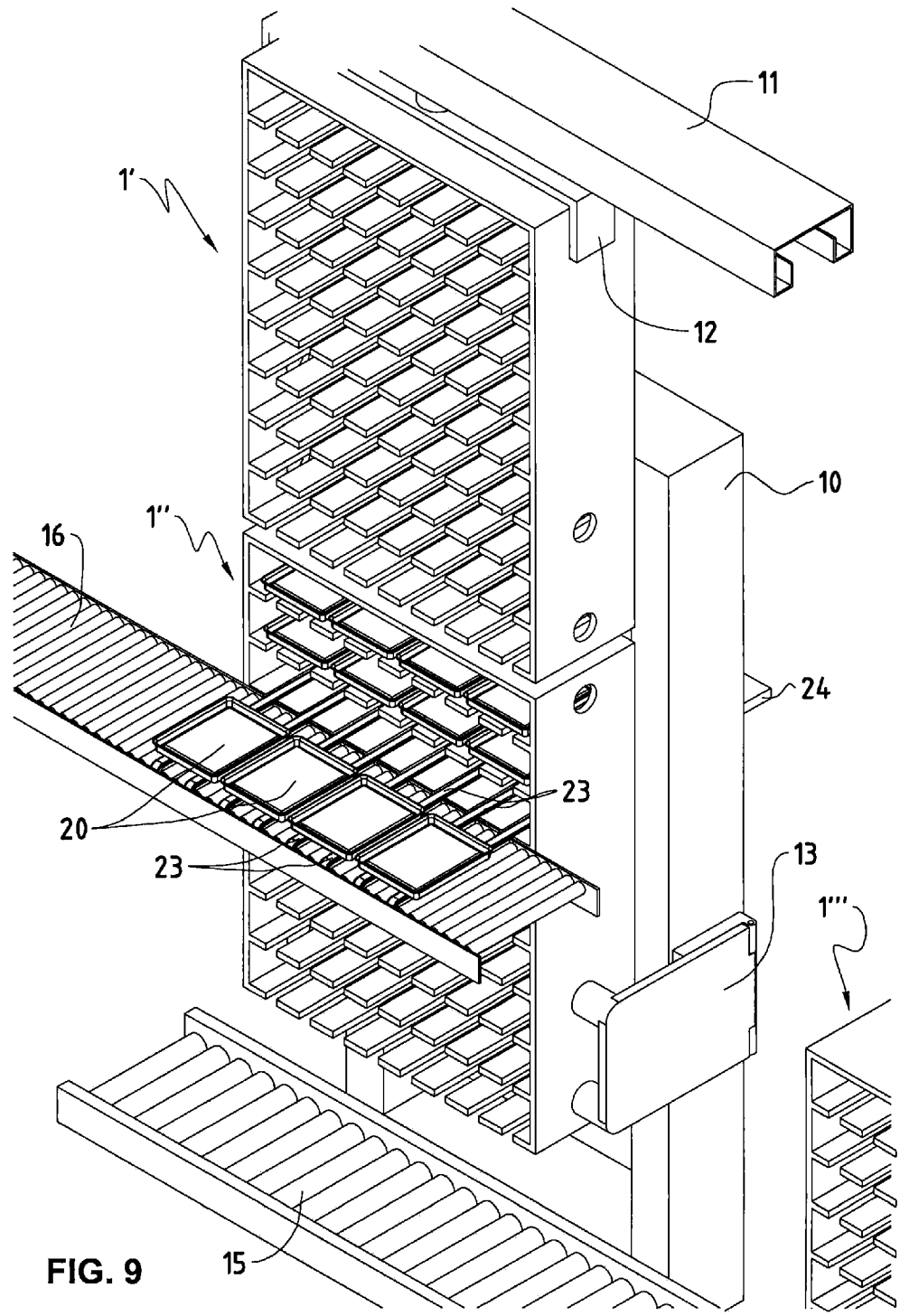
FIGS. 9 and 10 illustrate front and rear perspective views of an example loading/unloading station forming part of a system according to the third embodiment of the invention.
Figure 10:
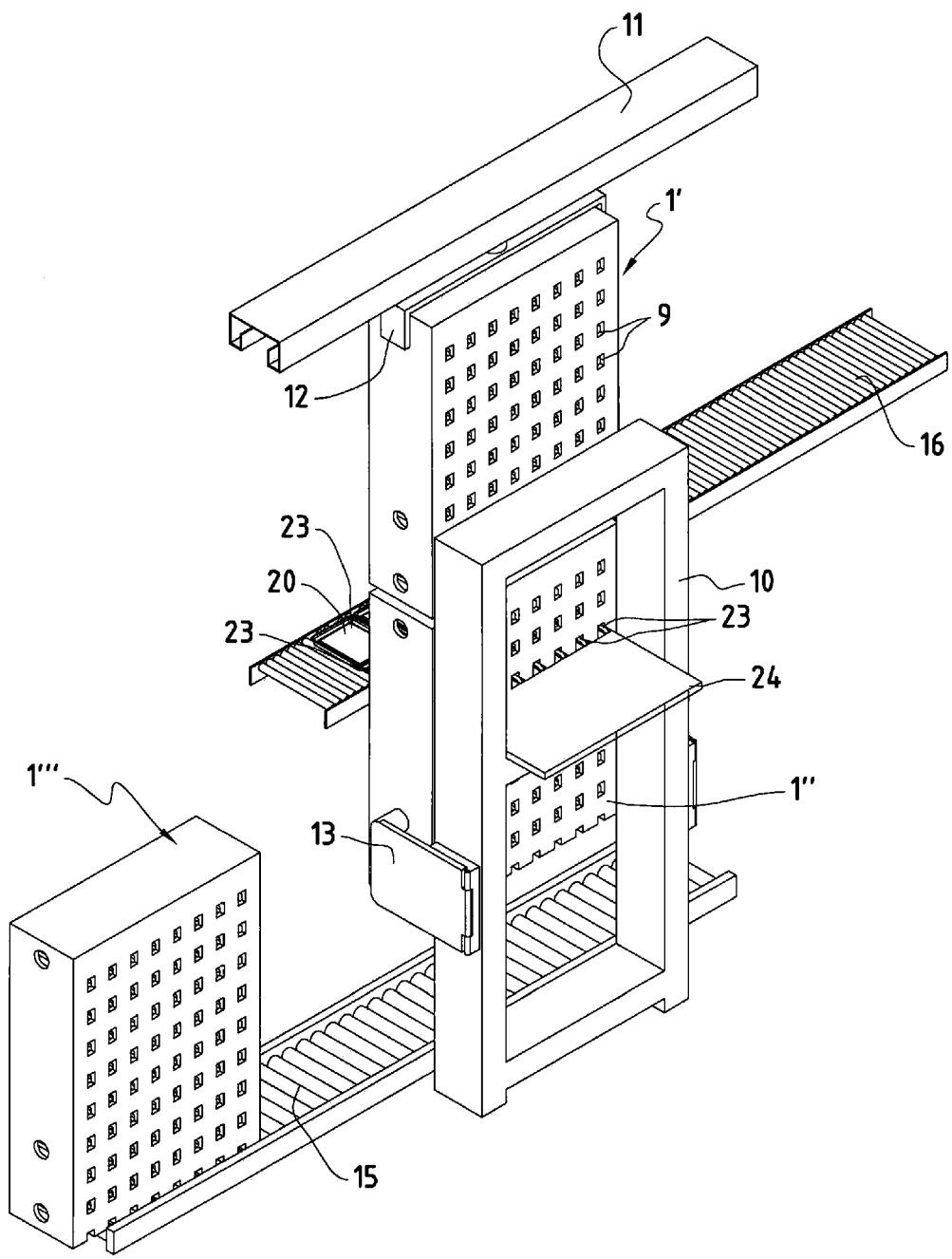

FIGS. 5A and 5B illustrate a carrier device 1 according to the second embodiment of the invention. The carrier device 1 is similar in construction to that of the first embodiment, with a frame 3 and product-supporting surfaces 2, except in that it has slits 8 in the product-supporting surfaces 2. FIGS. 6 and 7 illustrate how such a carrier device may be used in a loading/unloading station of a system according to the invention.

The slits 8 in the product-supporting surfaces 2 are designed to allow the passage of narrow, elongated conveyor elements 23 through the product-supporting surfaces 2 as the carrier device travels vertically past the conveyor 14. Note that the conveyor 14 has been illustrated as a roller conveyor, since this construction allows the narrow conveyor elements (eg belts) 23 to cross the width of the conveyor 14 without interfering with the tray-carrying function of the conveyor 14.

In the illustrated example, each product item or tray is shown supported by two narrow conveyor elements 23, each significantly narrower than the tray or product item. However, each tray or product item could be slid into or out of its product accommodating region by a single such conveyor element 23. Alternatively, instead of narrow conveyor belts, elongated bars or plates can be used to lift or slide the product items or trays 20 into or out of the carrier devices 1. The conveyor elements 23 are depicted supported by a generalized representation of a supporting structure 24.

Each carrier device therefore largely surrounds the conveyor elements 23 as the successive rows of product accommodating regions travel vertically past the conveyor elements 23. When unloading, each product item or tray 20 is lifted off its product-supporting surface 2 by one or more of the conveyor elements 23 as the carrier device proceeds downwards, whereupon the product item or tray 20 can be withdrawn from the carrier device by the conveyor elements(s) 23. The carrier device 1 may continue to proceed downwards as the product items or trays 20 of a row are withdrawn, assuming that the trays are fully withdrawn by the time the next product-supporting surface comes level with the conveyor elements 23, so that an interference is avoided. Alternatively, the motion of the carrier device may be paused or slowed while the product items or trays 20 are withdrawn, and then accelerated again to bring the next row into line with the conveyor elements 23 as quickly as possible. When conveyor belts are used as conveyor elements 23, these can be fixed in position, since the carrier devices are designed to pass around them without interference, and they therefore require fewer moving parts and less maintenance than conveyor elements 23 which must be retracted in order to avoid interference with the passing carrier devices.

FIGS. 7A and 7B show how the product items or trays are lifted off the product-supporting surfaces 2 of the carrier device 1 as the latter passes vertically downward past the unloading station. In FIG. 7A, the conveyor 23 is passing through the slit 8 of a product-supporting surface 2, and the upper surface of the conveyor 23 is below the upper surface of the product-supporting surface 2. The tray 20 still rests on the product-supporting surface 2.

FIG. 7B shows the same arrangement as in 7A, but separated by a short time interval: the upper surface of the conveyor 23 is now above the upper surface of the product-supporting surface, and the product item or tray 20 has therefore been lifted off the product-supporting surface 2 and is free to be displaced outwards (for unloading) or inwards (for loading) as shown by arrow 25.

Again, as with the description relating to the first embodiment, the unloading sequence described above can be reversed for loading trays 20 into the carrier devices 1.

FIGS. 8 to 11 illustrate the principles of a third embodiment of the invention. The carrier device 1 depicted in FIGS. 8A to 8C is similar to that of the second embodiment, except in that the slits 8 may be accessed from the rear side through conveyor access openings 9. Thus, as shown more clearly in FIGS. 9 and 10, conveyors 23 may be introduced through the rear face of the carrier device in order to lift the product items or trays 20 off the product-supporting surfaces 2 and displace them on to conveyor 16. Such an arrangement is shown in FIG. 11—the vertical progress of the carrier device may be slowed or halted while the conveyor elements 23 are inserted through the rear face of the carrier device 1 and while the trays are then displaced out from (or into) their respective tray-accommodation regions.

FIG. 11B shows how a bar or plate 33 may be used to lift the trays off their product-supporting surface and bear them forwards out from the carrier device. In this case the inserting and lifting motions can be performed simultaneously, such that the inserting movement of the bar/plate 33 also transports the product item or tray 20 on to the conveyor 16. The bar/plate may also have a rotational degree of freedom, as indicated by arrow 29, to enable it to lift the product item or tray 20 off the product-supporting surface 2 more quickly as the bar/plate 33 moves forward.

Again, as with the description relating to the first and second embodiments, the unloading sequence described above can be reversed for loading trays 20 into the carrier devices 1.

Note that the first, second and third embodiments may be combined in any combination, to suit the purposes of the particular application.

The loading/unloading operations can be performed under control of a system control unit (not shown), which may be configured, in conjunction with appropriate sensors, actuators etc, to control the movements of the carrier devices 1 and/or the various system components (conveyors etc), and to optimise the throughput of trays or product items through the processing system.

For example, the pusher/conveyor elements 21, 22, 23 may be configured and actuated such that individual trays or product items 20 are loaded or unloaded, or such that multiple trays 20 (eg whole rows of trays or product items 20) are loaded or unloaded together.

The loading/unloading station has been described with just one row of pusher/conveyor elements 21, 22, 23. However, the station could be configured with two or more rows of pusher/conveyor elements 21, 22, 23, thereby speeding up the loading/unloading operation.

FIGS. 12A and 12B illustrate in schematic form how the carrier devices 1 described above may be organised to transport product items through a product processing environment. The example shown is a simple one, and real systems could be expected to comprise multiple processing stages. An overhead conveyor 11 transports the suspended carrier devices 1, in this example via buffer zones 35, to a set of processing stations 30, where the carrier devices 1 are unloaded. The empty carrier devices 1 can then be returned, as shown. Alternatively, if required, the carrier devices 1 can be re-filled with the products which have been processed by stations 30, whereupon they can continue on their route through to another processing station. Buffer zones 35 serve to optimize the flow of carrier devices 1 through the system. If the carrier devices are carrying multiple different types of product, each of which needs to be delivered to a particular one of the processing machines, the flows of the different types of product can be controlled so as to optimize the overall throughput, or to prioritise one kind of product over another, for example. Switchable-points divert the carrier devices as required, under the control of the system control unit (not shown).

The invention claimed is:

1. A carrier device for conveying a batch of product items between two or more processing stations in a product processing system, the carrier device comprising:
   a substantially rigid frame including a substantially planar array of product accommodating regions, at least one transport attachment points for engaging with a carrier conveyor means, and a plurality of pusher openings in a rear face of the array,
   wherein each of the product accommodating regions includes a product support surface for bearing at least one of the product items during the conveying,
   wherein the array comprises a plurality of rows and a plurality of columns of product accommodating regions;
   wherein each of the product accommodating regions is provided with a first access opening in a front face of the array, a product item can be one of introduced into and removed from the product accommodating region through said access opening,
   wherein a pusher bar can be inserted through the plurality of pusher openings so as to expel the product item from the product accommodating region by sliding the product towards the front face and out of the product accommodating region, and
   wherein the product support surface of each product accommodating region includes at least one slit, each slit extending along an axis substantially orthogonal to a plane of the array and extending over at least half of the distance between the front face and the rear face, wherein each slit is open towards the at least one of the front and rear face of the array, and arranged to allow a narrow, elongated conveyor belt or bar to pass through the slit in the product support surface so as to lift the product item resting on the product support surface clear of the product support surface.

2. A product batch handling system, comprising:
   a plurality of processing stations for performing one or more processing operations on a plurality of similar product items;
   a plurality of batch product carriers, each of the batch product carriers accommodating a plurality of the product items during one of transporting or storing the product items between the plurality of processing stations;
   a batch product carrier conveying device for transporting the plurality of batch product carriers between the plurality of processing stations;
   each of the plurality of batch product carriers is a carrier device according to claim 1; and
   at least one of a loading mechanism for introducing the plurality of product items into the product accommodating regions of the batch product carrier devices from a first product conveyor, and an unloading mechanism for displacing the plurality of product items out of the product accommodating regions of the carrier devices on to a second product conveyor.

3. The product batch handling system according to claim 2, wherein at least one of the loading mechanism and the unloading mechanism includes a vertical displacement mechanism for moving each carrier device in at least one of a plurality of vertical directions such that the plurality of access openings of a plurality of successive vertical rows of the product accommodating regions of the array travel vertically past the at least one of the loading mechanism and the unloading mechanism, and wherein at least one of the loading mechanism and the unloading mechanism includes at least one of a plurality of displacement devices for at least one of introducing product items into and removing product items from the at least one of the plurality of rows of product accommodating regions.

4. The product batch handling system according to claim 3, wherein the vertical displacement mechanism is arranged to move the carrier devices substantially continuously past at least one of the loading mechanism and the unloading mechanism, and wherein at least one of the loading mechanism and the unloading mechanism is adapted to at least one of introduce product items into and remove product items from the carrier device travelling past.

5. The product batch handling system according to claim 3, wherein the vertical displacement mechanism is arranged to index the carrier devices vertically past at least one of the loading mechanism and the unloading mechanism in a series of steps corresponding to the rows of the array, and wherein at least one of the loading mechanism and the unloading mechanism is adapted to at least one of introduce the product items into and remove the product items from the carrier device while the vertical movement of the carrier device is paused.

6. The product batch handling system according to claim 3, wherein the product support surface of the product accommodating region includes at least one slit, and wherein at least one of the loading mechanism and the unloading mechanism includes a plurality of narrow, elongated conveyors arranged such that, when the row of the product accommodating region passes vertically past at least one of the loading mechanism and the unloading mechanism, the plurality of conveyors pass through the slits so as to lift product items off the product support surfaces.

7. The product batch handling system according to claim 2, wherein the unloading mechanism includes at least one of a first pusher bar, for each row of the product accommodating region passing vertically past the unloading mechanism, the first pusher bar being displaced through the at least one pusher openings so as to displace at least one product items out through at least one of the access openings and onto the second product conveyor.

8. The product handling system according to claim 2, wherein the loading mechanism includes at least one of a second pusher bar, for each row of the product accommodating region passing vertically past the loading mechanism, said second pusher bar pushing at least one product items off the first product conveyor through at least one of the access openings and into at least one of the product accommodating regions.

9. The product batch handling system according to claim 2, wherein the batch product carrier conveying device includes at least one overhead conveyor track, and wherein at least one of a plurality of carrier devices are suspended from the overhead conveyor track during the transport of the at least one of the plurality of carrier devices between a plurality of processing stations.

10. The product batch handling system according to claim 9, wherein the overhead conveyor track includes at least one of a junction and a bifurcation, and wherein the route taken by at least one of the carrier devices along the overhead conveyor track is determined by a state of at least one of a plurality of switching points under control of a system control unit.

11. The product batch handling system according to claim 9, wherein the overhead conveyor track includes a plurality of buffer regions for temporarily accumulating a plurality of carrier devices upstream of the at least one of the plurality of processing stations so as to buffer the flow of carrier devices to the at least one of the plurality of processing stations.

12. The product batch handling system according to claim 2, further comprising at least one storage regions, wherein the plurality of carrier devices are arranged for storage of the plurality of product items.

13. The product batch handling system according to claim 2, wherein the plurality of carrier devices are shaped such that said carrier devices are stackable one upon another.

14. The carrier device according to claim 1, wherein the carrier device includes a machine-readable data tag containing one of identification and origin information of the product items being carried by the carrier device.

15. The carrier device according to claim 1, wherein the carrier device includes a machine-readable data tag containing identification information relating to the contents of the carrier device, and wherein the identification information is referenced to the row-column positions of the product items in the array.

* * * * *